United States Patent [19]
Middle

[11] 3,936,364
[45] Feb. 3, 1976

[54] APPARATUS AND METHOD FOR TREATMENT OF WATER OLIGODYNAMICALLY

[76] Inventor: Sidney A. Middle, 1718 27th St., Columbus, Nebr. 68601

[22] Filed: Feb. 20, 1973

[21] Appl. No.: 333,648

[52] U.S. Cl. ............... 426/66; 204/149; 204/228; 204/269; 210/29; 424/132; 21/54 R
[51] Int. Cl.[2] ................... C02B 3/10; C02B 1/82
[58] Field of Search ....... 204/149, 228, 269, 137 G, 204/149; 210/64

[56] References Cited
UNITED STATES PATENTS

| | | | |
|---|---|---|---|
| 800,791 | 10/1905 | Bowden | 204/149 |
| 840,335 | 1/1907 | Hyle | 204/275 |
| 907,140 | 12/1908 | Frei | 204/275 |
| 976,045 | 11/1910 | Clancy | 204/234 |
| 1,534,709 | 4/1925 | Holt | 204/DIG. 9 |
| 1,544,052 | 6/1925 | Avery | 204/149 |
| 1,956,411 | 4/1934 | Bonine | 204/149 |
| 2,046,467 | 7/1936 | Krause | 204/149 |
| 3,547,801 | 12/1970 | Paine | 204/149 |
| 3,616,412 | 10/1971 | Gnage | 204/231 |

OTHER PUBLICATIONS

"Something New In Water Sterilization," by C. H. Brandes, Beach and Pool Magazine, July 1934, pp. 1-2.
"EMF Series," Handbook of Chemistry & Physics, 32nd Ed., 1950, p. 1521.
"Modern Electroplating," by F. A. Lowenheim, 2nd Ed., 1963, p. 335.

Primary Examiner—R. L. Andrews
Attorney, Agent, or Firm—Oblon, Fisher, Spivak, McClelland & Maier

[57] ABSTRACT

Disclosed is a method and apparatus for treatment of water wherein contaminated water is passed through a series of water treatment modules so that it can be rendered safe for contact with and consumption by humans and animals. Circuit means are disclosed whereby electrodes in the modules can be energized to perform said treatment.

4 Claims, 3 Drawing Figures

APPARATUS AND METHOD FOR TREATMENT OF WATER OLIGODYNAMICALLY

BACKGROUND OF THE INVENTION

The need for purification, disinfection, and sterilization of water to produce water safe for human contact and consumption is of growing importance in recent times. More and more of the nation's water supply has become polluted and unsafe for human use.

Virtually all metropolitan areas employ various water treatment processes to eliminate suspended solids, unpleasant tastes and odors, and harmful bacteria from their water supply. It would, of course, be more desirable to use water purified by natural means such as sunlight and aeration for surface water and percolation and infiltration through soil for ground water, but such pure sources of water are increasingly scarce. Recently, even some rural areas must purify water before use by humans and animals.

Virtually all surface water employed for human contact and consumption must be disinfected before use. Filtration, coagulation and similar processes are employed to remove solid matter from water, but disinfection is required to remove harmful microorganisms, bacteria and the like. Examples of such bacteria are organisms of the coliform group and fecal streptococci.

The most common water disinfection method employed at the present time is chlorination. The degree of contamination of the water determines the amount of chlorine necessary to disinfect the water, and many municipal water supplies must be treated with so much chlorine that the consumer can actually smell and taste the chlorine in the water. Such a concentration of chlorine may be required to disinfect the water but it is unpleasant to the consumer.

Silver ions have long been known to be a good antiseptic and disinfecting agent. Very minute quantities of silver exercise great bactericidal power, but prior attempts to employ silver in commercial water disinfecting processes have met with limited success. One reason for such limited success is the necessity to maintain the silver concentration in the water at an acceptable and safe level for human or aninal consumption. Various authorities differ on a safe level of silver concentration, but it is noted that a silver concentration of 0.2 parts per million (ppm) (0.200 mg/l) can be of no physiological significance. The Public Health Service has viewed a concentration of silver in excess of 0.050 mg/l (milligrams per liter) as grounds for rejection of the supply of silver-treated water.

Silver ions, in concentrations sufficient to kill bacteria, do not affect the color, taste or smell of water. But, at the maximum safe concentration levels or below, many types of bacteria are not killed instantly, so some residence time is required to achieve sterilization. Silver ions may be introduced into water by several conventional means such as chemical ion exchange or by electrolysis.

A considerable demand exists for a practical method and apparatus for treating water from small, single dwelling wells such as the type of well found on a farm. Since long residence times for disinfecting water are not practicable for water coming from a well as compared to a municipal treatment facility, some practical method and apparatus for raising the level of silver concentration above the safe, maximum levels, so that disinfection can proceed at a faster rate, and then lowering the concentration to within safe levels so as to produce potable water, would find great use in conjunction with unsafe farm wells.

Chlorination is also a typical method used to treat and disinfect swimming pool water to kill harmful bacteria. Chlorine is frequently objectionable because it has a strong odor and it causes the unpleasant sensation of burning eyes that swimmers frequently feel. A need therefore exists for a method and apparatus which will kill harmful bacteria in swimming pool water and yet will neither create objectionable odors nor be irritating to the swimmer.

SUMMARY OF THE INVENTION

Disclosed is a method and apparatus for the treatment of water by electrolytically introducing silver ions into the water and rendering it safe for contact with and consumption by humans and animals.

A series of water treating modules are provided and each includes a water treatment chamber, a flow inlet, and a flow outlet. In the first module, hereinafter sometimes referred to as Module A, silver electrodes, either solid or plated, are provided within the module. The silver electrodes are arranged in two sets or groups with all electrodes in a given group being electrically connected to each other. The electrodes are positioned within the chamber so that water flowing through the chamber will contact and surround the electrodes. The second module, hereinafter sometimes referred to a Module B, is of a construction similar to that of Module A, except that the electrodes are steel coated or plated with zinc.

Electrical circuit means are provided to supply current to each of the modules. Two separate transformers and two separate rectifiers are used to allow pulsating, filtered direct current to pass through each of the modules. A voltage divider permits the application of a given voltage to the primary winding of the first transformer and a lesser voltage from the secondary winding is applied across the first, full wave rectifier, which is connected to the electrodes in Module A. Voltage is also supplied to the second transformer. A lesser voltage from the secondary winding of the second transformer is applied across a second, full wave rectifier, which is connected to the electrodes in Module B. A voltage divider is not necessary to the operation of Module B, but one could be used if desired.

A timing device in the circuit for Module A actuates a switch and periodically reverses the direction of current flow through the module. As disclosed herein, a current reversal period of approximately 1 minute is employed. Since both sets of electrodes are silver or silver coated, the reversal of the direction of the current tends to minimize the rate of destruction of the set of electrodes.

Module B need not be run with a several of the current and so is operated by merely passing the filtered, direct current through the module.

Appropriate flow activated valving means are provided to automatically break the circuit when the flow of water falls below a certain level. An example of a suitable fow control switch is Penn Control Flow Switch, Model No. 60B1000, which operates at a low of 10 P.S.I. and a high of 150 P.S.I. Since Module A and Module B are operated in series, when flow drops below said level, both modules are shut down. When the modules are shut down, silver ions will cease to be introduced into the residual water remaining in the modules, and thus a buildup of silver ions, which could be harmful, can be avoided.

The method and apparatus of the present invention is most successful when the water to be treated is free of chlorine in order to avoid the formation of a silver chloride compound in the water.

The just-described apparatus is employed to perform the method of the present invention by introducing water into water treatment Module A through the flow inlet and allowing the water to flow through the module and in contact with the silver electrodes that are mounted in the module. Pulsating, filtered direct current is supplied to the two sets of electrodes and the direction of flow of the current is periodically reversed within a time range in excess of one-half minute up to approximately 2 minutes. Current level may be determined by an inspection of an ammeter placed in the circuit and it is noted that the current level will decay during the period in which the current is flowing in a given direction. The water leaving the flow outlet of Module A is then introduced into water treatment Module B. The silver-treated water enters the flow inlet and flows through Module B where it contacts the zinc coated electrodes that are mounted in the module. Pulsating, filtered direct current is supplied to the electrodes. The flow of the current need not be periodically reversed. From Module B, the water flows out the flow outlet to whatever use is desired for the water. The disinfected water can be used in swimming pools, to water plants, or for contact with or consumption by people or animals.

The flow rate of the water is controlled and coordinated with the current level so that a sufficient concentration of silver ions pass into the water to kill bacteria and yet the concentration can be lowered to below the safety levels for potable water.

My method for the disinfection and sterilization of water, and an apparatus for performing my method, can best be understood with reference to the drawings and examples.

DESCRIPTION OF A PREFERRED EMBODIMENT

Figure 1:
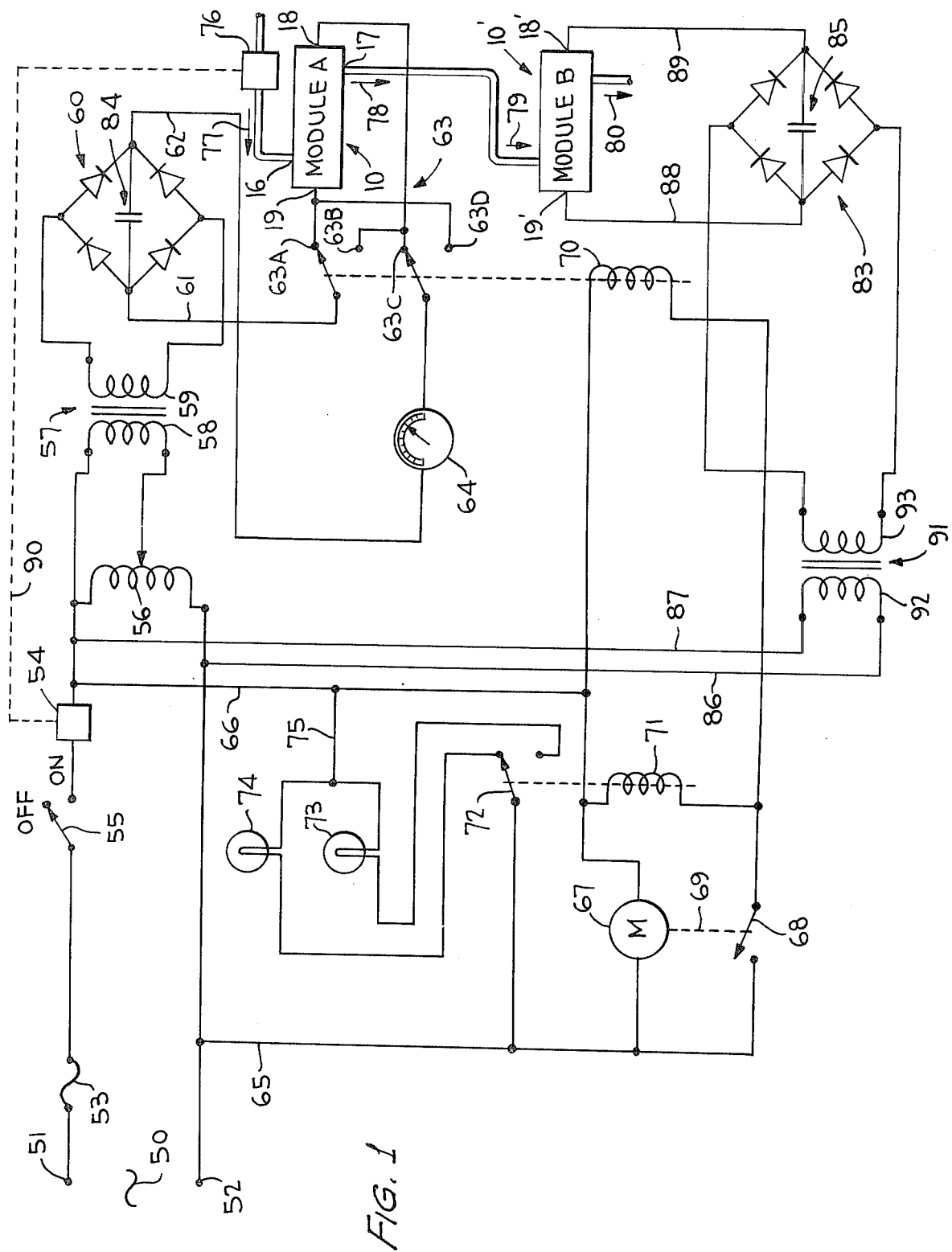
FIG. 1 is a schematic of the electrical circuit employed in the device used to perform my method of treating water.
Figure 2:
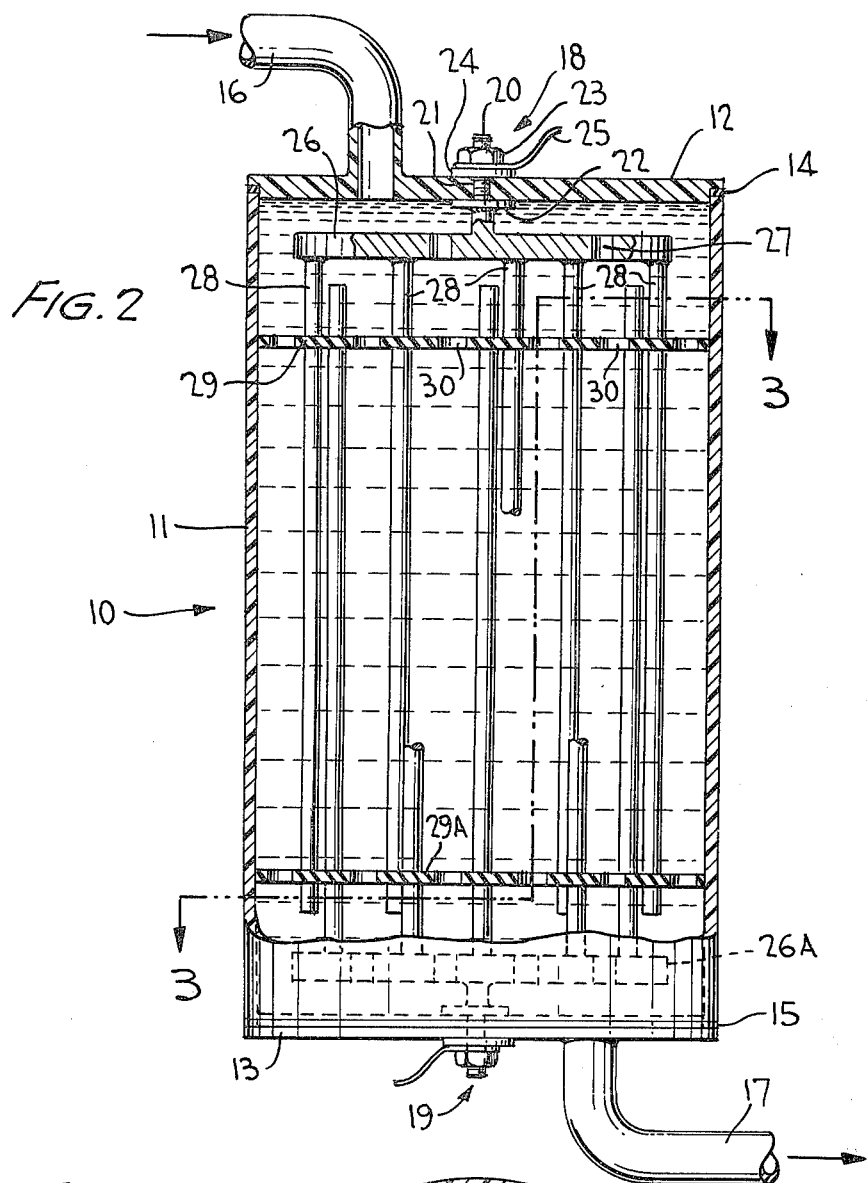
FIG. 2 is a side view of one of the water treating modules employed in my invention, with a portion of the figure in section.

Water treatment module 10 (FIG. 2), although indicated as Module A in FIG. 1, is typical of that used as either Module A or Module B. The sole distinction between the two is that the electrodes in Module A will be silver surfaced, while the electrodes in Module B, indicated by the numeral 10' in FIG. 1, will be zinc surfaced.

Water treating module 10 (FIG. 2) is a cylindrically shaped element with a side wall 11, which may be formed of a transparent material, and end plates 12, 13 placed in sealing relation thereto. Resilient gasket means 14, 15 may, if desired, be placed between the end of the side wall and the mating face of the end plates to facilitate such a sealing relationship. The side wall may be formed from a transparent material to permit a visual inspection of the interior of the module for purposes of determining when the module should be cleaned.

End plate 12 has a fluid inlet fitting 16 attached thereto so that fluid may be introduced into the interior of module 10. In like manner, a fluid outlet fitting 17 is attached to end plate 13 so that fluid may be continually passed through module 10.

Each end plate 12, 13 has an electrical terminal post 18, 19, respectively, passing therethrough. Terminal post 18, shown in FIG. 2, will be explained in detail, but it is to be understood that terminal post 19 is of the same construction as post 18. A screw threaded rod 20 passes through hole 21 in end plate 12 and has sealing gasket 22 attached thereto on the inside of the end plate. A nut 23 is screwed onto the exterior end of the rod and may be tightened against fastening means 24. The fastening means may be any conventional fastener such as a threaded washer, a split ring, or the like, and it functions to hold rod 20 and its associated elements firmly to end plate 12. An electrically conductive wire 25 may be clamped between nut 23 and fastener 24 to insure good electrical contact between wire 25 and post 20.

Figure 3:
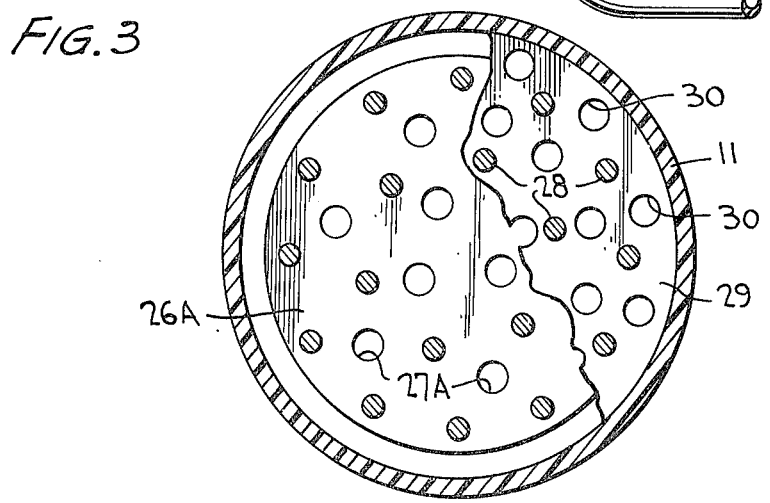
FIG. 3 is an end view of a portion of the water treating module, taken on line 3—3 of FIG. 2.

The interior end of rod 20 is attached to or integrally formed with an electrode carrying disc 26. This disc is formed in a manner to electrically connect rod 20 to the electrodes that are mounted on disc 26 and has a plurality of holes 27 passing therethrough to facilitate the passage of fluid through the module. The diameter of disc 26 is somewhat less than the diameter of the water treatment chamber inside the module so that additional space for fluid flow is provided around the edge of the disc. Electrode carrying disc 26A is attached to terminal post 19 as illustrated in FIG. 3, and holes 27A, corresponding to holes 27 in disc 26, are best visible in this FIGURE.

A plurality of electrodes 28 are attached to the side of disc 26 that faces the interior of the module. Disc 26 and electrodes 28 can be constructed of the same materials, e.g., in Module A, these can be either silver or silver coated, or disc 26 can be coated with an insulative material. In any event, compatibility is necessary between disc 26 and electrodes 28, as well as disc 26A and its respective electrodes, so as to prevent any interference with the silver ions and to prevent the introduction of any other ions into the water. The electrodes are arranged to extend axially of the module, and parallel to each other. The electrodes are supported within the module by two supporting elements 29, 29A which are disc shaped members of electrically non-conductive material and of a size to fit snugly against the interior surface of side wall 11. The electrodes pass through holes in supporting elements 29, 29A. Fluid passage holes 30 are also formed through disc 29 to permit fluid to pass through the module.

It is to be noted that disc 26 and its attached electrodes are positioned relative to the corresponding disc and electrodes at the other end of the module in a manner that will permit both sets of electrodes to be interleaved with each other yet free of contact with each other. As mentioned, supporting elements 29, 29A are electrically non-conductive and thus any current flowing from one set of electrodes to the other set of electrodes must pass through the fluid being treated in the module.

The circuit employed to energize the modules is represented schematically in FIG. 1. Leads 51, 52 are connected to a standard 120 volt, 60Hz, A.C. source.

Fuse 53 protects the circuit against overload. Switch 54 is a flow control switch that breaks the circuit if the fluid, passing through the pipe leading to the water treating modules, drops below a given flow rate. Since silver ions will cease to be introduced into the water, a harmful buildup of silver ions in the residual water remaining in the modules can be avoided. Flow can be measured by any standard measuring device 76 (FIG. 1) which can be put in the inlet line 16 leading to Module A. A signal representing flow rate is transmitted as indicated by dotted line 90 to the flow control switch 54. Manual switch 55 is employed by the operator as a master switch for the circuit.

Leads 51 and 52 are attached to both voltage divider 56, which permits the application of zero to 120 volts across primary winding 58 of transformer 57, and to leads 86 and 87, which permits application of 120 volts across the primary winding 92 of transformer 91. While a voltage divider is not necessary to the operation of Module B, one could be employed if desired. Secondary winding 59 is connected to full wave rectifier 60 and leads 61 and 62 from rectifier 60 are connected to switch 63. Meter 64 is graduated in milliamps and gives a visual indication of the amount of current passing through Module A. A condensor 84 is connected to rectifier 60 to filter the D.C. voltage going to Module A. Condensor 84 may be a 100 MFD (microfarads) condensor.

Leads 65 and 66 are connected to timing motor 67 and to opposite sides of microswitch 68. As indicated by dotted line 69, motor 67 actuates microswitch 68 by conventional means such as a camming mechanism attached to the shaft of motor 67, and positioned adjacent the microswitch. As the cam turns, switch 68 may be closed for a given length of time and open for a given length of time.

Switch 68, when closed, actuates relays 70 and 71. Relay 70 is associated with switch 63 and is employed to throw switch 63 to reverse the direction of current passing through Module A. Switch 63 contacts terminals 63A and 63C for one direction of current through the module and contacts terminals 63B and 63D for current in the other direction through the module. When microswitch 68 opens, relay 70 is disabled and switch 63 will return to its original position.

Relay 71 operates in a manner similar to relay 70, but it controls switch 72. Both relays are shown schematically connected to the corresponding switches by means of dotted lines. Each side of switch 72 is connected to a separate indicator light 73, 74 and both lamps are connected to lead 66 by means of lead 75. Energizing relay 71 will cause switch 72 to be thrown and energize one of the indicator lamps. The disabling of relay 71 will permit the switch to return to its initial position and energize the other indicator lamp.

As is apparent lamp an inspection of FIG. 1, relays 70 and 71 are enabled and disabled simultaneously so that indicator lamps 73 and 74 function as a visual indicator of the direction of current through module 10. One lamp is lit for one direction of current through the module and the other lampl is lit for the other direction of current.

The flow of water through the two modules is indicated in FIG. 1 by arrows 77–80. Arrows 77 and 78 indicate the flow of water into and out of Module A and arrows 79 and 80 indicate the flow of water into and out of Module B.

Module B operates in a manner similar to that of Module A. Voltage is taken off leads 51 and 52, by leads 86 and 87, and passes to the primary winding 92 of transformer 91. Secondary winding 93 is connected to a second, full wave rectifier 83 to posts 18' and 19' in Module B. Posts 18' and 19' are similar to posts 18 and 19 in Module A. A condensor 85, is connected to rectifier 83 to filter the D.C. voltage going to Module B. Condensor 85 may be a 40 MFD condensor. Timing means to change the direction of the current is not necessary to the operation of Module B, since it is operated by merely passing the filtered, direct current through the module. But, if it was desireable to operate Module B by periodically reversing the direction of the current, timing means, similar to that used for Module A could be employed.

EXAMPLES

The following examples are given for the purpose of creating a better understanding of the invention, but are not to be considered as limiting in any sense.

EXAMPLE I

A sample of the untreated sewer water, taken from the Columbus, Nebraska Sewage Treatment Plant, was analyzed and showed a positive test result of bacteria and a silver level of 0.05 mg/l. This sewer water was used as the starting material to be treated using the method and apparatus of the invention. It was noted that even at a silver concentration of 0.05 mg/l, the sample still showed a positive test result for bacteria. The bacteria count was 4,100 colonies/100 mls. This was not a count for total bacteria; it was a count of the number of coliform colonies. Coliform contamination is the indicator on which the purity test is based. The U.S. Department of Health, Education and Welfare has stated that the coliform count of drinking water shall not exceed 40 colonies/100 mls.

EXAMPLE II

A sample of the untreated sewer water was passed, at a rate of 240 gallons per hour through a ½ inch pipe line, through water treatment modules A and B. Module A was run at a reading of 40 milliamps, while the polarity was periodically reversed in a 5 minute time period cycle. An analysis of the water coming out of Module B showed a silver concentration of 0.05 mg/l and a bacteria test result of negative, indicating that the water was safe for human contact and consumption.

EXAMPLE III

The same method was followed as in Example II, except that the polarity was periodically reversed in a 2 minute time period cycle. An analysis of the water coming out of Module B showed a silver concentration of 0.02 mg/l and that the bacterial level was negative. The silver concentration in this example was well below the Public Health Service maximum of 0.05 mg/l.

EXAMPLE IV

The same method was followed as in Example II, except that Module B was not used and Module A was run using a polarity reversal time period of 8 minutes, and the ammeter gage was read while in the positive post of the cycle. An analysis of the water coming out of Module A showed a negative bacterial test and a silver concentration of 0.84 mg/l. This silver concentration was clearly high enough to disinfect the sewer water flowing into Module A, but, by not using Module B, the concentration of silver exceeded the Public Health Service maximum level.

EXAMPLE V

The same method was followed as in Example IV, except that the ammeter reading was taken on the negative post during the cycle. An analysis of the water leaving Module A showed a negative bacteria test and a silver concentration of 0.85 mg/l. This example would seem to confirm the results of Example IV, in that without Module B, the silver concentration is high enough to disinfect the water but is considered to be too high a level to be safe for contact with and consumption by humans.

As can be seen from the foregoing examples, using only Module A of the apparatus of the invention, the silver concentration was high enough to disinfect the sewer water, but was too high for the water to be considered safe for human contact and consumption. When Module B was used along with Module A, high enough silver concentrations were achieved to disinfect the sewer water, and yet the silver ion concentration was kept at or below what is generally considered a safe level for drinking water.

Merely having a silver ion concentration at or below the maximum Public Health Service level would appear to be insufficient to disinfect the water. Example I showed a silver concentration of 0.05 mg/l but was not considered safe for human contact or consumption, because it showed a positive bacteria test result. When both Module A and Module B were used to treat sewer water by the method of this invention, satisfactory bacteria and silver levels were achieved and thus the water could then be considered safe for human contact and consumption.

I claim:

1. A method of treating water comprising the steps of:
   placing said water in a first chamber,
   passing said water in said first chamber into contact with a first set of electrodes, at least the surfaces of which are silver;
   supplying direct current to said silver surfaced electrodes so that said current passes in a direction from one of said silver surfaced electrodes to another of said silver surfaced electrodes, whereby silver ions are introduced into said water at a concentration sufficient to reduce the amount of bacteria in said water to a level which would be acceptable for contact with humans or animals;
   reversing the direction of said current at intervals of between one-half and two minutes whereby the effective lifetime of said silver surfaced electrodes is maximized;
   transferring said water into a second chamber,
   passing said water in said second chamber into contact with a second set of electrodes, at least the surfaces of which are zinc, supplying direct current to said zinc surfaced electrode so that said current passes in a direction from one of said zinc surfaced electrodes to another of said zinc surfaced electrodes, whereby said concentration of silver ions is reduced to a level acceptable for contact with humans and animals;
   removing said water from said second chamber and from contact with said second set of electrodes for utilization.

2. The method of claim 1 wherein said step of reversing includes the step of:
   reversing said current at intervals of approximately 1 minute.

3. An apparatus for treating water, comprising:
   a first fluid chamber,
   means to introduce water into said first fluid chamber,
   a first set of elongate electrodes, at least the surfaces of which are silver, within said first fluid chamber;
   a second fluid chamber,
   a second set of elongate electrodes, at least the surface of which are zinc, within said second fluid chamber;
   said first and second fluid chambers comprising cylindrically shaped side walls, first and second spaced, insulated end plates within each chamber lying transverse to and integral with the long axes of the side walls of said chambers, said insulated end plates supporting the ends of oppositely chargeable elongate electrodes, and electrical terminal means for coupling said electrodes to suitable circuit means;
   means for fluid commumication between said first and second fluid chambers,
   means to remove water from said second fluid chamber,
   circuit means to energize said silver-surfaced set of electrodes and said zinc-surfaced set of electrodes whereby silver ions are introduced into said water in said first fluid chamber to provide a predetermined concentration thereof, said concentration being subsequently reduced in said second fluid chamber;
   said circuit means including means to pass direct current from one of said silver-surfaced electrodes to another of said silver-surfaced electrodes and means to pass direct current from one of said zinc-surfaced electrodes to another of said zinc-surfaced electrodes; and,
   timer means included in said circuit means for periodically reversing the direction of said current passing between said silver-surfaced electrodes at intervals of between one-half and two minutes.

4. The apparatus of claim 3 wherein:
   said side walls of said first and second fluid chambers are constructed of transparent material to permit a visual inspection of the interior of said enclosures.

* * * * *